May 31, 1960 E. A. EUL, JR 2,939,073
CONDUCTIVITY MEASURING INSTRUMENT
Filed Aug. 14, 1958 2 Sheets-Sheet 1

Inventor
Edward A. Eul, Jr.

May 31, 1960  E. A. EUL, JR  2,939,073
CONDUCTIVITY MEASURING INSTRUMENT
Filed Aug. 14, 1958
2 Sheets-Sheet 2

Inventor
Edward A. Eul, Jr.
By Hill, Sherman, Meroni, Gross & Simpson Attys

United States Patent Office 2,939,073
Patented May 31, 1960

2,939,073

CONDUCTIVITY MEASURING INSTRUMENT

Edward A. Eul, Jr., Chicago, Ill., assignor to Magnaflux Corporation, Chicago, Ill., a corporation of Delaware Filed Aug. 14, 1958, Ser. No. 755,046

5 Claims. (Cl. 324—34)

This invention relates to a non-destructive testing system operating on the eddy current principle, in which an alternating current excited test coil is placed in inductive relation to a test piece of unknown characteristics, and in which the characteristics of the test piece are determined from the effect on the electrical impedance of the test coil. The system of this invention is particularly designed to measure the effective conductivity of the test piece, either the absolute electrical conductivity, or some property related thereto. It may for example, be used in detecting cracks, or in the separation of metals according to resistivity, alloy, heat treat, thickness, etc.

A number of instruments of this type have heretofore been developed, but a great deal of difficulty has been encountered in attempting to measure conductivity independently of other characteristics. For example, surface roughness, oxide coatings, dirt, variations in probe positioning and other factors have affected the measurements and made it difficult to provide any degree of consistent accuracy. There are eddy current probe type instruments on the market that require a smooth, clean surface on the metal to be tested before any degree of accuracy can be obtained. There are others that require a "jig" to maintain the probe position while a meter reading is taken. Another uses a highly damped meter that cannot respond to transient positioning variations but, instead, averages out the variations in the final meter reading measurement. Still another type of prior instrument utilizes adjustable capacitor means in series with the test coil, which is operable within a limited conductivity range to compensate for small variations in spacing between a test coil and the test piece, but cannot effectively compensate for wide variations in spacing or changes in the angular position of the coil relative to the test piece.

This invention was evolved with the objects of providing an improved eddy current type instrument and method of operating the same, to obtain compensation for wide variations in relative positioning between a test coil and test piece, while permitting a sensitive, accurate, reproduceable and reliable measurement of the effective conductivity of the test piece.

According to this invention, a test coil is connected in parallel with a capacitor to provide a tuned circuit which is connected in series with an impedance to an alternating current source. The junction between the tuned circuit and impedance is connected to one terminal of a voltage-indicating means, the other terminal thereof being coupled to the alternating current source, preferably through a pair of impedances respectively connected to the opposite terminals of the source.

It has been discovered that with this type of arrangement, the operating frequency can be so chosen or adjusted as to obtain an indication which is substantially independent of changes in the physical positioning of the coil relative to the test piece and which, at the same time, is highly sensitive to changes in the effective conductivity of the test piece.

It has been further discovered that the optimum frequency of operation is determined by the intersection between two curves, one curve being a plot of the voltage indication versus frequency with the test coil in inductive relation to a standard test piece of known characteristics and the other curve being a plot of the voltage indication versus frequency with the coil disposed in air out of inductive relation to any test piece. With the frequency so adjusted, the test coil may then be disposed in inductive relation to a test piece of unknown characteristics, to obtain an indication highly sensitive to changes in effective conductivity, but substantially independent of changes in the physical positioning of the coil relative to the test piece.

It may here be noted that the standard test piece used for reference need not be physically disconnected from the test piece of unknown characteristics. For example, a preferred application of the invention is in the testing for cracks which produce the same effect as a change in conductivity and thus represent a change in the effective conductivity. In such a system, a portion of a plate or other article under test which is known to be free from defects may be used as the standard or reference test piece, after which tests may be performed on other portions of the same article, to determine the presence of cracks.

In one preferred type of operation, the voltage-indicating means has a high input impedance, so as not to appreciably affect current flow through the tuned circuit and impedance in series therewith. Under such conditions, it is found that there is a single intersection of the response curves at a frequency which is separated from but relatively close to the resonant frequency of the tuned circuit. When testing ferrous or magnetic materials, the frequency is lower than the resonant frequency of the tuned circuit, while when testing non-ferrous metals, the optimum frequency is higher.

In another preferred type of operation, one terminal of the voltage-indicating means is connected to the junction between the tuned circuit and the impedance in series therewith, and the other terminal thereof is connected through a pair of impedances to the opposite terminals of the alternating current source, so as to form a bridge circuit, and the impedance between the terminals of the voltage-indicating means is relatively low, such that there is substantial current flow between the terminals with any unbalance of the bridge circuit. This low impedance may be defined, at least in part, by the inherent internal impedance of a conventional meter used as the voltage-indicating means.

Under such conditions, it is found that there are a plurality of points of intersections between the two curves, but that the most sensitive point of operation is at an intersection of the curves which occurs at a frequency on the order of one-half the resonant frequency of the tuned circuit.

Further features of the invention reside in specific methods of adjusting an instrument to obtain optimum operating conditions. Other objects, features and advantages will become more fully apparent from the following detailed description taken in conjunction with the accompanying drawings, which illustrate preferred embodiments and in which.

Figure 1:
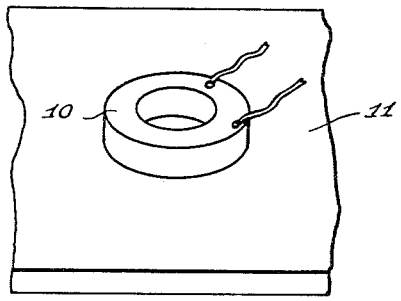
Figure 1 is a diagrammatic perspective view illustrating the use of one type of test coil.
Figure 2:
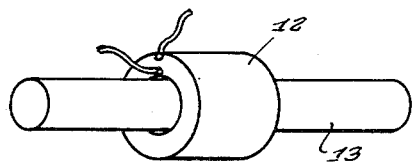
Figure 2 is a diagrammatic perspective view illustrating the use of another type of test coil.

As shown in Figure 1, a test coil 10 may be disposed against the surface of a plate 11 or, as shown in Figure 2, a coil 12 may be disposed in surrounding relation to a rod or tube 13. The purpose of these arrangements is to measure the effective conductivity of the plate 11 or the rod or tube 13, either the electrical conductivity of the material of the article, or some property related thereto. For example, cracks may be detected or changes in alloy, heat treat, plate thickness, etc. may be measured.

In both of the arrangements of Figures 1 and 2, the effective electrical resistance and effective inductive reactance of the coils are affected by the effective conductivity of the test pieces, so that the impedance of the coils may be measured to determine conductivity. However, the impedance is affected by other factors. For example, in the arrangement of Figure 1, the impedance is affected by variations in the spacing between coil 10 and plate 11, as caused by variations in surface roughness, oxide coatings, dirt, etc. It is also affected by variations in the angular position of the coil axis relative to the plate, as might occur in attempting to scan the plate. In the arrangement of Figure 2, the impedance may be affected by the changes in the diameter of the rod or tube 13, without any change in the effective conductivity, and may also be affected by changes in the position of the axis of coil 12 relative to the axis of bar 13.

Figure 3:
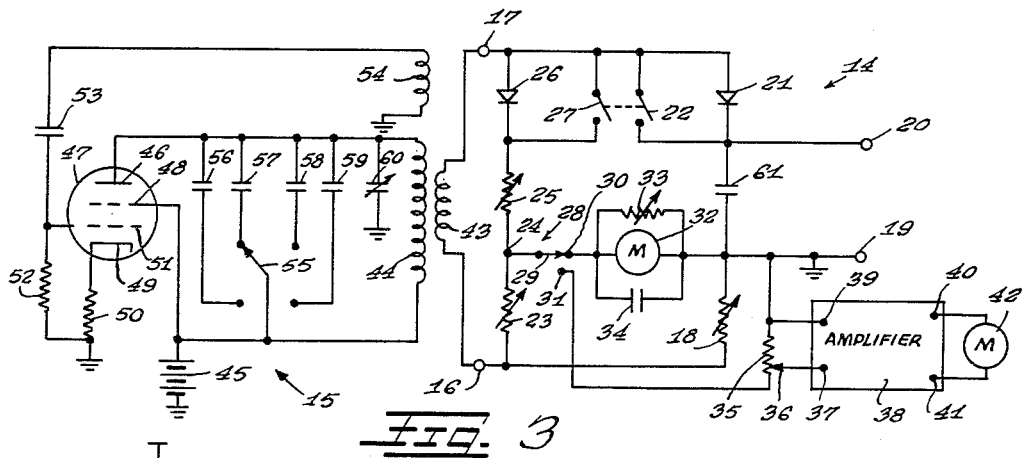
Figure 3 is a schematic electrical diagram of an instrument constructed according to the principles of this invention.

As indicated above, the instruments and methods of this invention provide compensation for wide variations in the relative positioning of a test coil and test piece, while permitting a sensitive, accurate, reproduceable and reliable measurement of the effective conductivity. Referring to Figure 3, reference numeral 14 generally designates an instrument constructed according to the principles of this invention.

The instrument 14 comprises an oscillator generally indicated by reference numeral 15 which forms an adjustable frequency alternating current source having a pair of output terminals 16 and 17. Terminal 16 is connected through a rheostat 18 to a grounded terminal 19 for connection to one terminal of a test coil, such as coil 10 of Figure 1 or coil 12 of Figure 2. The other terminal of the test coil is connected to a terminal 20 which is connected to the output terminal 17 of the alternating current source, preferably through a diode or uni-directional conduction device 21, which may be selectively shorted out by means of a switch 22.

Terminal 16 is also connected through a rheostat 23 to a circuit point 24 which is connected through rheostat 25 to the terminal 17, preferably through a diode or uni-directional conduction device 26 arranged to be selectively shorted out by a switch 27 ganged to the switch 22.

Either one of a pair of voltage-indicating means may be connected between circuit point 24 and the grounded terminal 19. In particular, a selector switch 28 is provided having a movable contact 29 connected to circuit point 24 and a pair of fixed contacts 30 and 31.

Contact 30 is connected through a meter 32 to the grounded terminal 19 with a sensitivity adjustment rheostat 33 and a capacitor 34 in parallel therewith.

Contact 31 is connected to ground through a potentiometer 35 having a movable contact 36 connected to an input terminal 37 of an amplifier 38 having another input terminal 39 connected to ground. The amplifier 38 has output terminals 40 and 41 connected to a meter 42.

The oscillator 15 comprises an output coil 43 connected to terminals 16 and 17 and a coil 44 inductively coupled to the output coil 43 and connected at one end to the positive terminal of a battery 45 or other direct current source, and at the other end to the plate or anode 46 of a vacuum tube 47. The vacuum tube 47 has a screen grid 48 connected to the positive terminal of battery 45, a cathode 49 connected through a resistor 50 to ground, and a control grid 51 which is connected through a resistor 52 to ground and also through capacitor 53 and a coil 54 to ground, the coil 54 being a feed-back coil inductively coupled to the plate coil 44. A frequency selector switch is provided having a movable contact 55 connected to the positive terminal of battery 45, and selectively engageable with a plurality of fixed contacts respectively connected through capacitors 56–59 to the plate 46. A variable capacitor 60 is connected between the plate or anode 46 and ground. The frequency range may thus be selected by adjustment of the selector switch, while the capacitor 60 may be adjusted to obtain any desired frequency in each range.

According to this invention, a capacitor 61 is connected between terminals 19 and 20 so as to form with the test coil a parallel resonant or tuned circuit. It has been discovered that with this arrangement, the operating frequency can be so chosen or adjusted as to obtain an indication in either the meter 32 or the meter 42 which is substantially independent of changes in the physical positioning of the coil relative to the test piece and which, at the same time, is highly sensitive to changes in the effective conductivity of the test piece. It has been further discovered that the optimum frequency is determined by the intersection between two curves, one curve being a plot of the voltage indication versus frequency with the test coil in inductive relation to a standard test piece of known characteristics and the other curve being a plot of the voltage indication versus frequency with the coil disposed in air out of inductive relation to any test piece.

Figure 4:
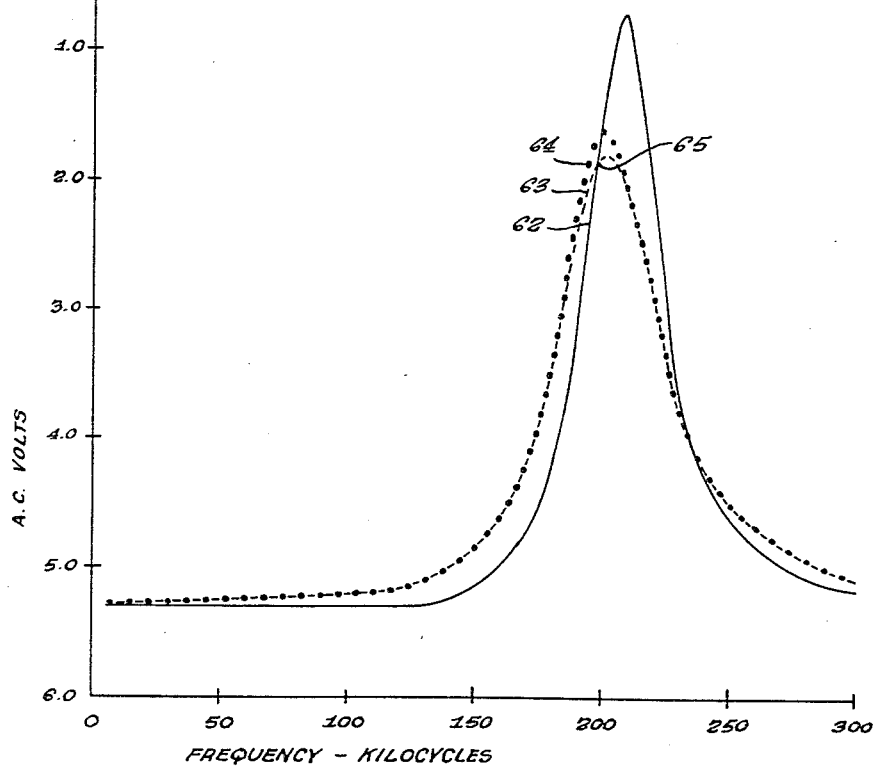
Figure 4 is a graphical illustration of the response curves obtained under one set of operating conditions with the instrument of Figure 3.

This feature may be better understood by reference to Figure 4 which is a plot of the voltage output versus frequency under certain conditions of operation. In particular, a coil such as the coil 10 of Figure 1 was connected between terminals 19 and 20, the coil having an inductance of approximately 137 microhenrys, with a capacitor 61 having a capacitance of 0.005 microfarads. The resistor 18 was adjusted to a value of approximately 300 ohms. Switches 22, 27 were closed to short out the diodes 21, 26, the rheostat 23 was adjusted to zero resistance, switch contact 29 was positioned to engage contact 31, and potentiometer contact 36 was adjusted to obtain a calibration of the meter 42 to indicate the A.C. voltage between ground and circuit point 24. The resistance of potentiometer 35 and the input impedance of amplifier 38 were relatively high so as not to have any appreciable effect on the current flow through the series combination of the tuned circuit and rheostat 18.

Under such conditions and with the test coil in air out of inductive relation to any test piece, a response curve was obtained as indicated by reference numeral 62 in Figure 4. The test coil was then placed against a portion of a steel plate known to be free from cracks or defects, and response curve 63 was obtained. Response curve 64 was obtained with the test coil placed against a portion of the plate having a crack therein.

Under there conditions, the optimum frequency of operation is that corresponding to point 65 at which the curves 62 and 63 intersect. When operating at this point, the indication is substantially independent of changes in the physical positioning of the coil relative to the test piece. However, the indication is highly sensitive to changes in the effective conductivity of the test piece, as will be apparent from the difference between curve 64 and curves 62, 63 when operating at a frequency corresponding to point 65.

As indicated above, the curves of Figure 4 were obtained with the rheostat 23 adjusted to zero resistance, the voltage across rheostat 18 being thus measured. It will be appreciated that rheostat 23 and/or rheostat 25 may be adjusted to obtain any desired output voltage under any particular condition of operation, and also that the potentiometer contact 36 may be adjusted to increase or decrease the sensitivity of measurement. For example, with an operating frequency corresponding to the intersection point 65, rheostat 23 may be adjusted to obtain zero output voltage. Any meter reading then obtained will indicate a change in the effective conductivity relative to the conductivity of the standard test piece. The sensitivity may then be increased by adjustment of contact 36, to obtain full scale meter deflection with a certain relatively small change in conductivity. It may be noted that adjustment of rheostats 23, 25 or the potentiometer contact 36 does not affect the form of the curves illustrated in Figure 4, assuming that the resistance of the potentiometer and the input impedance of the amplifier are relatively large, as indicated above.

Figure 5:
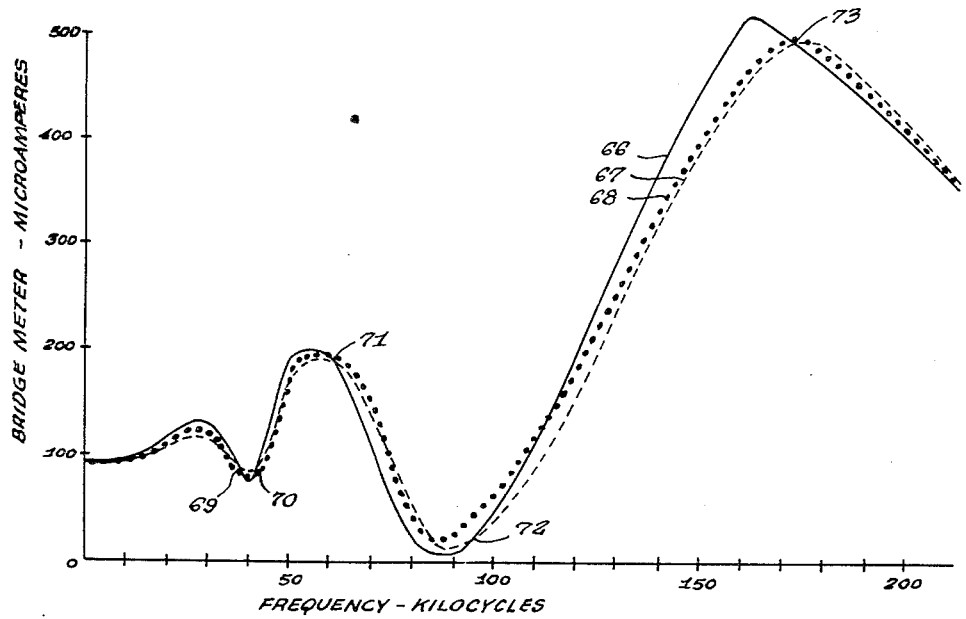
Figure 5 is a graphical illustration of response curves obtained under another set of operating conditions with the instrument of Figure 3.

Figure 5 illustrates response curves obtained under another set of operating conditions. In particular, rheostats 18, 23 and 25 were adjusted to values of approximately 100 ohms, switches 22, 27 were opened to connect diodes 21, 26 in the circuit, and switch contact 29 was connected with contact 30 to connect meter 32 in the circuit, the meter 32 being a direct current microammeter, with capacitor 34 having a capacitance of about 50 microfarads. It may be noted that the purpose of using diodes 21, 26 is to permit use of a direct current meter, and capacitor 34 serves to provide an effective short-circuit for alternating current components.

Under such conditions, and with the test coil in air out of inductive relation to any test piece, a response curve was obtained as indicated by reference numeral 66 in Figure 5. The test coil was then placed against a portion of a steel plate known to be free of cracks or defects, to obtain a curve as indicated by reference numeral 67. The test coil was then placed against another portion of the plate having a crack therein, and curve 68 was obtained.

It will be noted that the curves 66 and 67 intersect at points 69, 70, 71, 72 and 73 and may also intersect at higher frequencies. The instrument, according to this invention, may be operated at any one of such points, to obtain compensation for variations in the physical positioning of the coil relative to the test piece. It will be noted, however, that when operating at frequencies corresponding to points 69, 70, 71 and 73, the response obtained with a cracked portion of the test piece, as indicated by curve 68, is only slightly different from that obtained from an uncracked portion as indicated by curve 67. However, at a frequency corresponding to intersection point 72, there is a relatively large change in indication between that produced by a cracked portion and that produced by an uncracked portion. Accordingly, the preferred operating point is the point 72.

It is noteworthy that each of the intersection points 69-73 in Figure 5, and also the intersection point 65 in Figure 4, is relatively close to a frequency at which the response goes through a maximum or a minimum value. It should also be noted that the most sensitive operating point 72 of Figure 5, is relatively close to a minimum point occurring at a frequency approximately one-half the resonant frequency of the tuned circuit defined by the coil and the capacitor 61.

Variations in the exact form of the response curves are produced with changes in the coil, changes in the material being tested, etc. However, it is found that the response curves will have the same general form as shown so long as certain prerequisites are observed. Curves having the same form as illustrated in Figure 4 will be obtained with voltage indicating means having a high input impedance, and curves such as shown in Figure 5 will be obtained so long as a bridge circuit is used with the impedance between the terminals of the meter or other voltage-indicating means being of a comparatively low value. Its value should not exceed a value of the same order of magnitude as the impedances of the other portions of the circuit, so that there will be a substantial current flow between the meter terminals with any unbalance of the bridge circuit. It should also be noted that the uni-directional conduction devices 21, 26 are not required, and serve only to permit the use of a direct current meter.

It is also noteworthy that the illustrated response curves were obtained with a steel plate of magnetic material. With a similar type of plate of copper or other non-magnetic metal, the response curves 63, 64 of Figure 4 will be shifted to the right, and an intersection point similar to point 65 will occur at a frequency higher than the resonant point of the curve 62, obtained with the coil in air. With respect to Figure 5, when a test piece of copper or other non-magnetic metal is used, the response curves 67, 68 will be shifted to the left, and intersection points similar to points 70, 71, 72 and 73 will occur at frequencies lower than the frequency at which the curve 66 goes through maximum and minimum values, rather than at higher frequencies as illustrated.

It should further be noted that variations from the above-described sets of operating conditions are possible within the scope of this invention. For example, when a meter such as meter 32 is connected directly between ground and circuit point 24, a high impedance meter may be used, to obtain curves such as illustrated in Figure 4. Similarly, when the amplifier 38 is used, the input impedance thereof, and also the resistance of potentiometer 35, may be of a low value to obtain curves such as shown in Figure 5. If diodes 21, 26 are used in conjunction with an amplifier such as amplifier 38, the amplifier should, of course, be a D.C. amplifier. It should also be apparent that signal lights or sorting devices may be used instead of meters as voltage-indicating means.

Further features of the invention reside in certain methods of adjusting an instrument to obtain optimum operating conditions. In particular, the test coil may be disposed in one of two positions, one position being in inductive relation to a standard test piece and the other being out of inductive relation to any test piece. According to one feature of the invention, a preliminary adjustment of the frequency of the source is then made by adjusting the frequency to a point at which a reversal in the direction of the voltage indication appears. This will place the frequency relatively close to an optimum point, since as indicated above, the intersection point 65 in Figure 4, as well as each of the intersection points 69-73 in Figure 5, is relatively close to a frequency at which the response goes through a maximum or a minimum value.

According to another feature, the coil is moved between a position in inductive relation to a standard test piece and a position out of inductive relation to any test piece while the frequency is adjusted until no change in the voltage indication occurs when the test coil is moved between such positions. Thereafter, of course, the coil may be placed in inductive relation to a test piece of unknown characteristics, to measure the effective conductivity thereof substantially independently of variations in the physical positioning of the test coil relative to the test piece.

After adjusting to a frequency at which no change in indication is obtained with movement of the test coil between two positions as described above, it may usually be desirable to adjust to obtain a certain voltage indication, for example a zero indication, which may be accomplished by adjustment of rheostat 18, rheostat 23 or rheostat 25, preferably rheostat 23 or rheostat 25. After making such an adjustment, the sensitivity of the instrument may be increased, as suggested previously.

It may also be desirable to make a further adjustment, or check on the adjustment of the frequency, by again moving the test coil between the two positions while adjusting the frequency to a point at which no change in indication is obtained. If it is found necessary to thus readjust the frequency, it may, of course, be again necessary to adjust one of the rheostats to obtain the desired indication.

When making tests under conditions such as described above in connection with Figure 5, it is desirable to use the intersection point at a frequency on the order of one-half the resonant frequency of the coil and capacitor, to obtain highest sensitivity as indicated above. If the resonance frequency is not already known, it may be determined by adjustment of the frequency to obtain a maximum indication. As a preliminary adjustment, the frequency may be initially adjusted to a value equal to one-half the value so determined or known.

It will be understood that modifications and variations may be effected without departing from the spirit and scope of the novel concepts of this invention.

I claim as my invention:

1. In an instrument for measuring the effective conductivity of a test piece of unknown characteristics in relation to the effective conductivity of a standard test piece, a test coil arranged to be disposed in inductive relation to a test piece, a capacitor connected in parallel with said coil to form a tuned circuit, a pair of terminals, a circuit between said terminals including said tuned circuit, means for indicating the voltage across a portion of said circuit, and means applying to said terminals an alternating current having a frequency defined by an intersection between two curves, one curve being a plot of said voltage versus frequency with said test coil in inductive relation to said standard test piece and the other curve being a plot of said voltage versus frequency with said coil disposed in air out of inductive relation to any test piece.

2. In an instrument for measuring the effective conductivity of a test piece of unknown characteristics in relation to the effective conductivity of a standard test piece, a test coil arranged to be disposed in inductive relation to a test piece, a capacitor connected in parallel with said coil to form a tuned circuit, a pair of terminals, an impedance connected in series with said tuned circuit between said terminals, means for indicating the voltage between a point at a reference level with respect to said terminals and a point at the junction between said tuned circuit and said impedance, and means for applying to said terminals an alternating current having a frequency defined by the intersection between two curves, one curve being a plot of said voltage versus frequency with said test coil in inductive relation to said standard test piece and the other curve being a plot of said voltage versus frequency with said coil disposed in air out of inductive relation to any test piece.

3. In an instrument for measuring the effective conductivity of a test piece of unknown characteristics in relation to the effective conductivity of a standard test piece, a test coil arranged to be disposed in inductive relation to a test piece, a capacitor connected in parallel with said coil to form a tuned circuit, a pair of terminals, first and second impedances connected in series between said terminals, a third impedance connected in series with said tuned circuit between said terminals, a low impedance connected between two junctions, one being the junction between said first and second impedance and the other being the junction between said third impedance and said tuned circuit, means indicating the voltage across said low impedance, and means applying to said terminals an alternating current having a frequency defined by an intersection between two curves, one curve being the plot of said voltage versus frequency with said test coil in inductive relation to said standard test piece, and the other curve being a plot of said voltage versus frequency with said coil disposed in air out of inductive relation to any test piece.

4. In an instrument for measuring the effective conductivity of a test piece of unknown characteristics in relation to the effective conductivity of a standard test piece, a test coil arranged to be disposed in inductive relation to a test piece, a capacitor connected in parallel with said coil to form a tuned circuit, a pair of terminals, first and second impedances connected in series between said terminals, a third impedance connected in series with said tuned circuit between said terminals, a low impedance connected between two junctions, one being the junction between said first and second impedance and the other being the junction between said third impedance and said tuned circuit, means indicating the voltage across said low impedance, and means applying to said terminals an alternating current having a frequency defined by an intersection between two curves, one curve being the plot of said voltage versus frequency with said test coil in inductive relation to said standard test piece, and the other curve being a plot of said voltage versus frequency with said coil disposed in air out of inductive relation to any test piece, said frequency of said alternating current being on the order of one-half of the resonant frequency of said tuned circuit.

5. In an instrument for measuring the effective conductivity of a test piece of unknown characteristics in relation to the effective conductivity of a standard test piece, a test coil arranged to be disposed in inductive relation to a test piece, a capacitor connected in parallel with said coil to form a tuned circuit, a pair of terminals, an impedance connected in series with said tuned circuit between said terminals, means for indicating the voltage between a point at a reference level with respect to said terminals and a point at the junction between said tuned circuit and said impedance, and means for applying to said terminals an alternating current having a frequency defined by the intersection between two curves, one curve being a plot of said voltage versus frequency with said test coil in inductive relation to said standard test piece and the other curve being a plot of said voltage versus frequency with said coil disposed in air out of inductive relation to any test piece, said frequency being different from but relatively close to the resonant frequency of said tuned circuit.

References Cited in the file of this patent

UNITED STATES PATENTS

| | | |
|---|---|---|
| 1,792,249 | Serduke | Feb. 10, 1931 |
| 2,495,627 | Bovey | Jan. 24, 1950 |